United States Patent
De Haan et al.

(10) Patent No.: US 7,489,350 B2
(45) Date of Patent: Feb. 10, 2009

(54) UNIT FOR AND METHOD OF SHARPNESS ENHANCEMENT

(75) Inventors: Gerard De Haan, Eindhoven (NL); Michiel Adriaanszoon Klompenhouwer, Eindhoven (NL); Leo Jan Velthoven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 620 days.

(21) Appl. No.: 10/515,474

(22) PCT Filed: Apr. 29, 2003

(86) PCT No.: PCT/IB03/01869

§ 371 (c)(1),
(2), (4) Date: Nov. 22, 2004

(87) PCT Pub. No.: WO03/100722

PCT Pub. Date: Dec. 4, 2003

(65) Prior Publication Data

US 2006/0061690 A1    Mar. 23, 2006

(30) Foreign Application Priority Data

May 24, 2002 (EP) .................................. 02077051

(51) Int. Cl.
H04N 5/208 (2006.01)

(52) U.S. Cl. ........................ 348/252; 348/606

(58) Field of Classification Search ................ 348/252, 348/474, 555, 575, 597, 606, 222.1, 625, 348/208.1, 208.3, 223.1
See application file for complete search history.

(56) References Cited

U.S. PATENT DOCUMENTS 4,982,280 A    1/1991    Lyon et al.

(Continued)

FOREIGN PATENT DOCUMENTS

WO    0011863 A1    3/2000

OTHER PUBLICATIONS

Gerard De Haan, et al: Temporal Aspects of Emerging Television Displays, IEEE Aug. 2001, pp. 326-334.

(Continued)

*Primary Examiner*—Lin Ye
*Assistant Examiner*—Nelson D Hernández Hernández (57) ABSTRACT

An image processing apparatus (100) comprises: receiving means for receiving a video signal representing input images; a film-detector unit (108) for detecting whether the input images have been captured by a film camera or by a video camera; and a sharpness enhancement unit (106) for calculating sharpness enhanced images on basis of the input images. The sharpness enhancement unit (106) is controlled by the film-detector unit (108), whereby the sharpness enhancement is larger if the film-detector unit (108) has detected that the input images have been captured by the film camera than if the film-detector unit (108) has detected that the input images have been captured by the video camera.

9 Claims, 4 Drawing Sheets

U.S. PATENT DOCUMENTS

| | | | |
|---|---|---|---|
| 5,221,966 A | 6/1993 | Clayton et al. | 358/140 |
| 5,742,700 A * | 4/1998 | Yoon et al. | 382/132 |
| 6,067,125 A | 5/2000 | May | 348/607 |
| 6,363,526 B1 | 3/2002 | Vlahos et al. | |
| 7,072,498 B1 * | 7/2006 | Roehrig et al. | 382/128 |
| 2002/0109788 A1 * | 8/2002 | Morton et al. | 348/625 |
| 2002/0140809 A1 * | 10/2002 | Swartz | 348/97 |

OTHER PUBLICATIONS

Karel Staes et al: Image Quality Transfer Through Film and Television, 1981, pp. 196-202.

Gerard De Haan: Video Processing for Multimedia Systems, 2000, ISBN 90-014015-8, pp. 115-126.

Manfred Ernst: Motion Compensated Video Processing for Studio Applications: Jun. 1992, Japan.

* cited by examiner

UNIT FOR AND METHOD OF SHARPNESS ENHANCEMENT

The invention relates to an image processing apparatus comprising a sharpness enhancement unit for calculating sharpness enhanced images on basis of input images.

The invention further relates to a method of sharpness enhancement.

An embodiment of the sharpness enhancement unit of the kind described in the opening paragraph is known from chapter 2 of the book "Video Processing for Multimedia Systems", by G. de Haan, University Press Eindhoven, the Netherlands, 2000, ISBN 90-014015-8. Sharpness enhancement of video signals increases the perceived image quality. Sharpness enhancement means modifications of the transients in the signal representing the values of pixels. Sharpness enhancement, usually a boosting of the higher frequency components, which is called "peaking" results in edges with increased steepness.

Very often sharpness enhancement is performed to compensate for blur during acquisition, storage or transmission of the image. There are several reasons which can cause blur, e.g. movement of the object being imaged related to the camera, or the object being out of focus. The amount of blur is a factor which is relevant for the amount of sharpness enhancement that can be performed without getting images looking unnatural.

A disadvantage of the known sharpness enhancement is that noise in the image is also increased. Enhancement of high frequency components in areas where little image detail is present, introduces noisiness. In these areas without edges peaking is undesired.

In summary, the appropriate amount of sharpness enhancement is not fixed. It depends e.g. on the amount of blur and on the signal-to-noise ratio.

It is an object of the invention to provide an image processing apparatus comprising a sharpness enhancement unit of the kind described in the opening paragraph being arranged to perform an amount of sharpness enhancement which is relatively well tuned with the images.

This object of the invention is achieved in that the image processing apparatus comprises:
- receiving means for receiving a video signal representing input images;
- a film-detector limit for detecting whether the input images have been captured by a film camera or by a video camera;
- a sharpness enhancement unit for calculating sharpness enhanced images on basis of the input images, the sharpness enhancement unit being controlled by the film-detector unit, whereby the sharpness enhancement unit is arranged to be tuned for sharpness enhancement on basis of the detecting whether the input images have been captured by the film camera or by the video camera.

It has been found that there are differences in sharpness between images which have been captured by a film camera and images which have been captured by a video camera. The image processing apparatus according to the invention is arranged to correct for these differences.

In an embodiment of the image processing apparatus according to the invention the sharpness enhancement is larger if the film-detector unit has detected that the input images have been captured by the film camera than if the film-detector unit has detected that the input images have been captured by the video camera. Preferably the larger sharpness enhancement is achieved by applying an increased amplification gain for high frequency components of the frequency spectrum of the input images.

Although the image resolution of images captured by a film-camera is often higher than the image resolution of images captured by a video camera it appears that the film originated images are less sharp than the video originated images. A reason for this difference in sharpness is that the film originated images are more blurred to suppress judder. This embodiment of the image processing apparatus according to the invention is arranged to correct for this difference.

A movie, i.e. film, is usually recorded at 24 images per second, but played back in cinemas at 48 images per second. Typically this is done by providing two short light pulses for each of the movie pictures, resulting in two images for each movie picture. In most countries movies are transmitted as video signals and displayed at 50 frames per second. In these countries the original images are displayed twice. This display scheme is called 2:2 pulldown. A disadvantage of this display scheme is that it causes judder artefacts in moving parts of the scene. In other countries, with "60 Hz systems", the conversion from 24 Hz to 60 Hz is done by displaying movie images in an alternating sequence of 3 and 2 repeated images. This display scheme is called 3:2 pulldown and also causes judder artefacts in moving parts of the scene. This so-called film judder becomes worse if the moving part has much detail in the images. The effect of judder is not only a "jerky" motion, but the judder also has a blurring effect that obscures details in moving parts. To avoid the judder, movie directors tend to track the main subject/object with the camera, and use a camera with a long shutter time to cause blurring in less interesting image parts, and/or keep background objects out of focus.

Images originating from video cameras are most often captured in interlaced mode and/or with higher acquisition speed. For these images, judder is not an issue and hence no precautions, e.g. extra blurring, have to be taken to achieve an appropriate image quality.

In an embodiment of the image processing apparatus according to the invention, the sharpness enhancement unit is arranged to enhance a first part of a frequency spectrum of the input images if the film-detector unit has detected that the input images have been captured by the film camera and to enhance a second part of the frequency spectrum of the input images if the film-detector unit has detected that the input images have been captured by the video camera, the first and the second part being different. Above it has been described that enhancement is larger for film-based material. Alternatively, different frequency components are emphasized on basis of the output of the film-detector unit. Preferably this is achieved by modifying filter coefficients, e.g. coefficients of convolution kernels.

An embodiment of the image processing apparatus according to the invention comprises a motion estimation unit for estimating direction of motion of objects in the input images and the motion estimation unit is arranged to control the sharpness enhancement unit, which is developed to perform the sharpness enhancement in the direction of the motion. Movement of objects relative to the camera, is a reason for blur: motion blur. Compensation for motion blur is an appropriate approach to enhance the sharpness. To achieve this type of motion compensated sharpness enhancement, the direction of the motion has to be determined. In the article "Motion compensated video processing for studio applications", by Manfred Ernst, in Les Assisies de Jeunes Chercheurs, 8-12 Jun. 1992, Tokyo, Japan and in the article "Overview of flaws in emerging television displays and remedial video processing" by G. de Haan and M. Klompenhouwer, in IEEE Transactions on Consumer Electronics, pp. 326-334, August 2001 methods are described to increase the sharpness of moving objects. The latter article discloses a motion compensated sharpness enhancement unit which is preferred in the image processing apparatus according to the invention.

In an embodiment of the image processing apparatus according to the invention comprising the motion estimation unit, the motion estimation unit is arranged to estimate speed of motion of the objects in the input images and the sharpness enhancement unit is developed to perform the sharpness enhancement on basis of the speed of the motion. Besides the direction of the motion also the speed of the motion is taken into account to perform the motion compensated sharpness enhancement. The advantage of this embodiment is that the amount of sharpness enhancement is relatively well matched with the actual direction and speed of the motion and hence with the actual motion blur.

An embodiment of the image processing apparatus according to the invention comprises a motion compensated picture-rate conversion unit being arranged to calculate interpolated images by means of temporal interpolation of the sharpness enhanced images, the picture-rate conversion unit being controlled by the motion estimation unit. This embodiment combines two means for sharpness enhancement:

The judder, meaning a blur caused by displaying images with moving objects, twice, is eliminated by using motion compensated picture-rate conversion. A typical picture rate conversion is from 25 Hz to 50 Hz. New images in between existing input images are calculated by means of interpolation. The result is that moving objects are shown in their correct position.

The image blur in the individual images, caused by e.g. long shutter times, is reduced by means of the motion compensated sharpness enhancement unit.

This combination is advantageous because it results in an optimal result. When performing motion blur reduction on video signals, the results might be counterproductive if the images are film-originated and no motion compensated picture rate conversion is performed, because the judder will be enhanced. Furthermore, the blurring effect associated with judder, renders the potential sharpness increase useless. On the other hand, the blurring effect caused by the image repetition can only partly be removed by the judder removal method, because the original movie material was already blurred because of the relatively long camera shutter time.

Another embodiment of the image processing apparatus according to the invention comprises a motion compensated picture-rate conversion unit being arranged to calculate interpolated images by means of temporal interpolation of the input images, the picture-rate conversion unit being controlled by the motion estimation unit. This embodiment comprises an alternative sequence of processing steps: first motion compensated picture-rate conversion and then motion compensated sharpness enhancement. An advantage of this embodiment is that the memory unit for storage of motion estimation vectors can be shared for the processing steps.

An embodiment of the image processing apparatus according to the invention comprising a motion compensated picture-rate conversion unit is characterized in that the sharpness enhancement unit is arranged to perform more sharpness enhancement for the interpolated images than for the input images. This embodiment according to the invention is arranged to adapt the sharpness enhancement to whether an image is interpolated or as received, e.g. to counteract the blurring due to the interpolation, which is typically bi-linear.

An embodiment of the image processing apparatus according to the invention is arranged to detect an edge in a motion vector field, being calculated by the motion estimation unit for an image pair of the input images, and is characterized in that the sharpness enhancement unit is arranged to limit the sharpness enhancement for a region of a particular input image, the region corresponding to the edge. This embodiment according to the invention is arranged to adapt the sharpness enhancement if motion artefacts, e.g. "halo" in occlusion regions, or wrongly estimated motion after a scene change, are expected. Hence, artefacts are not enhanced. Preferably the image processing apparatus comprises an occlusion detector for detecting regions in the input images with covering or uncovering and is arranged to control the sharpness enhancement unit to limit the sharpness enhancement for the regions in the input images with covering or uncovering.

It is an object of the invention to provide a method of the kind described in the opening paragraph to perform an amount of sharpness enhancement which is relatively well tuned with the images.

This object of the invention is achieved in that the method comprises:

receiving a video signal representing input images;
detecting whether the input images have been captured by a film camera or by a video camera;
calculating sharpness enhanced images on basis of the input images, the calculating on basis of the detecting whether the input images have been captured by a film camera or by a video camera.

In TV-sets this method is preferably used, to enhance the quality of video material. This method is also advantageous in a display-related motion blur reduction system: That means an image processing system arranged to compensate for motion blur which is caused by the display system. Since, the camera shutter time and the sample and hold of a e.g. an LCD display have the same kind of blurring, and similar algorithms can be used to reduce the blurring.

Modifications of the image processing apparatus and variations thereof may correspond to modifications and variations thereof of the method described.

These and other aspects of the image processing apparatus and of the method according to the invention will become apparent from and will be elucidated with respect to the implementations and embodiments described hereinafter and with reference to the accompanying drawings, wherein.

Same reference numerals are used to denote similar parts throughout the figures.

Figure 1A:
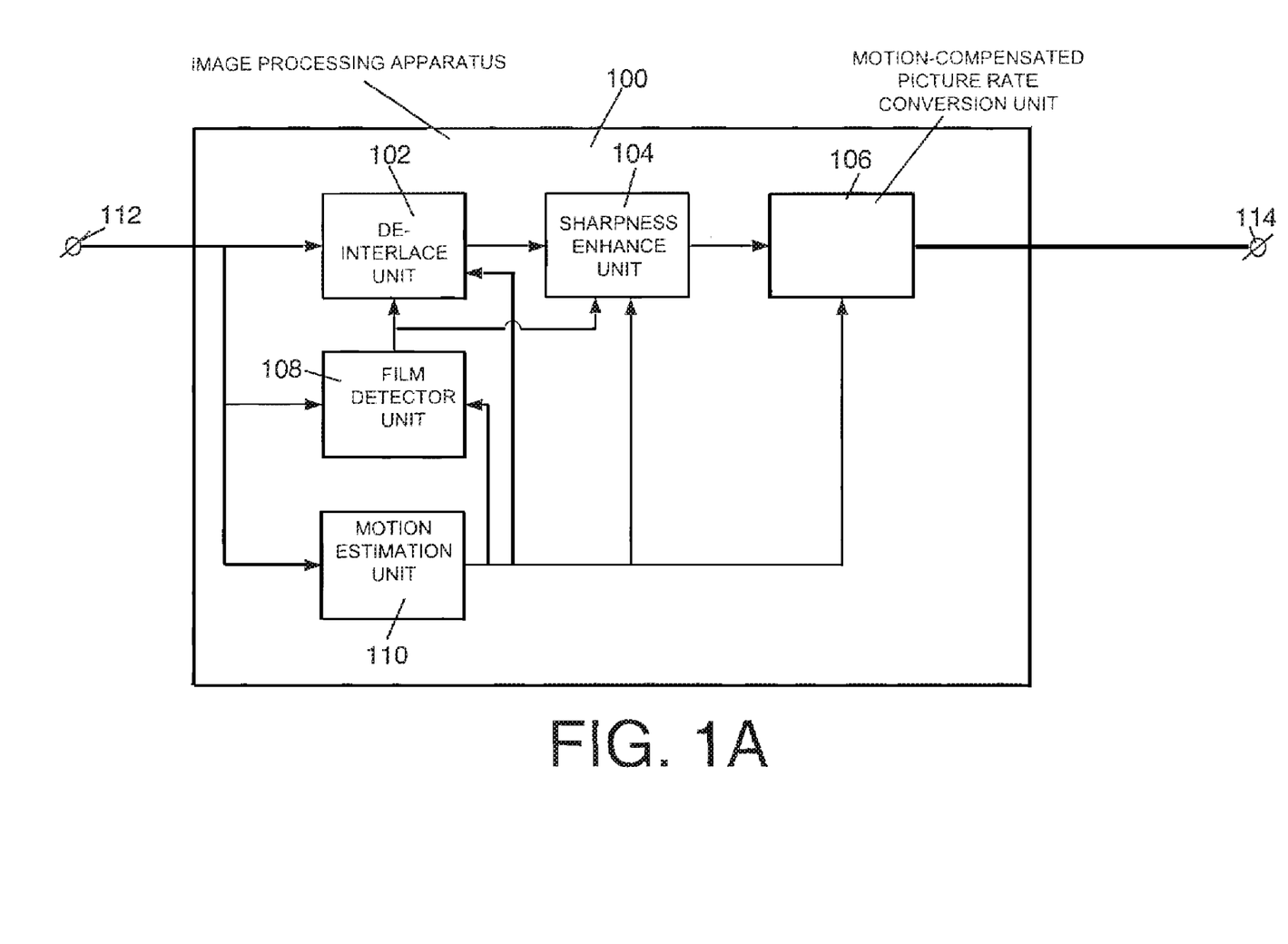
FIG. 1A schematically shows elements of the image processing apparatus according to the invention.

FIG. 1A schematically shows elements of the image processing apparatus 100 according to the invention. An input video signal is provided at the input connector 112 and the image processing apparatus provides the output video signal at the output connector 114. The input video signal represents images which might be captured by a film camera or by a video camera. It is assumed that the input video signal corresponds to 50 Hz interlaced and the output video signal corresponds to 50 Hz progressive or optionally 100 Hz progressive. These values are only exemplary.

The image processing apparatus 100 comprises:

- a de-interlacing unit 102. Interlacing is the common video broadcast procedure for transmitting the odd or even numbered image lines alternately. De-interlacing attempts to restore the full vertical resolution, i.e. make odd and even lines available simultaneously for each image. In paragraph 5.3 of the book "Video Processing for Multimedia Systems", by G. de Haan, University Press Eindhoven, the Netherlands, 2000, ISBN 90-014015-8 a preferred de-interlacing unit 102 is disclosed;
- a film-detector unit 108 for detecting whether the input images have been captured by a film camera or by a video camera. An example of a film-detector unit 108 is disclosed in U.S. Pat. No. 4,982,280. This film-detector unit is arranged to estimate differences between fields of the received signal, on basis of motion. By comparing these actual differences with known patterns of differences, the film-detector unit 108 is arranged to distinguish between the two types of video material: film-originated and video-originated;
- a sharpness enhancement unit 104 for calculating sharpness enhanced images on basis of the input images. The sharpness enhancement unit 104 is controlled by the film-detector unit 108, whereby the sharpness enhancement is larger if the film-detector unit 108 has detected that the input images have been captured by a film camera than if the film-detector unit 108 has detected that the input images have been captured by a video camera. Optionally the sharpness enhancement unit 104 is arranged to enhance a selected part of the frequency spectrum of the input images on basis of the output of the film-detector unit 108. E.g. if the film-detector unit 108 has detected that the input images have been captured by a film camera then relatively more lower frequency components have to be enhanced than if the film-detector unit 108 has detected that the input images have been captured by a video camera. Preferably the sharpness enhancement unit 104 is a motion compensate sharpness enhancement unit;
- a motion compensated picture-rate conversion unit 106 for calculating interpolated images by means of temporal interpolation of the sharpness enhanced images. In paragraph 4.3 of the book "Video Processing for Multimedia Systems", by G. de Haan, University Press Eindhoven, the Netherlands, 2000, ISBN 90-014015-8 a preferred motion compensated picture-rate conversion unit 106 is disclosed; and
- a motion estimation unit 110 for estimating motion in the input images. In paragraph 6.3 of the book "Video Processing for Multimedia Systems", by G. de Haan, University Press Eindhoven, the Netherlands, 2000, ISBN 90-014015-8 a preferred motion estimation unit 110 is disclosed. The output of the motion estimation unit 110, i.e. motion vectors, is provided to the other described units 102-108 of the image processing apparatus 100.

If film-originated material is detected by the film-detector unit 108 and the video is interlaced, the 25 Hz progressive image sequence, corresponding to the original film frames, are reconstructed by means of the de-interlacing unit 102. This is actually quite simple when it is known that the video signal is originated from film, since two consecutive fields in the interlaced video signal originate from the same film picture and can simply be combined to form an image. After de-interlacing, the de-interlaced images are motion-compensated sharpness enhanced. Because it is known that the video signal is film-originated, the excessive motion blur is reduced by performing a relatively strong motion-compensated sharpness enhancement. The sharpness enhanced images are then provided to the motion compensated picture-rate conversion unit 106, which coverts the 25 Hz image sequence to a 50 Hz or even 100 Hz (interlaced or progressive) image sequence. Hence, the result is an output video signal representing an image sequence comprising sharp images, which can be displayed "judder-free".

If the video material is not film-originated but video originated the de-interlacing unit 102 and the motion compensated picture-rate conversion unit 106 functions change their operation. The de-interlacing unit 102 combines pairs of fields that are acquired at different points in time into de-interlaced images. The motion compensated picture-rate conversion unit 106 is only active in case the required image rate of the output signal is higher than 50 Hz, e.g. 100 Hz. The de-interlaced images are motion-compensated sharpness enhanced. However the amount of sharpness enhancement is less now because there is no judder in the input video signal, and the input images are sharper.

In FIG. 1A, memory devices for temporarily storage of images and other intermediate results, which are needed by the various units 102-110 are not shown. However, the use of these memory devices, has some consequences for the behaviour of the image processing apparatus. In the simplest, but most expensive, image processing apparatus each unit 102-110 has its own memory device. But preferably the memory devices are shared. Particularly the motion estimation unit 110 and the de-interlacing unit 102, use a shared memory.

Figure 1B:
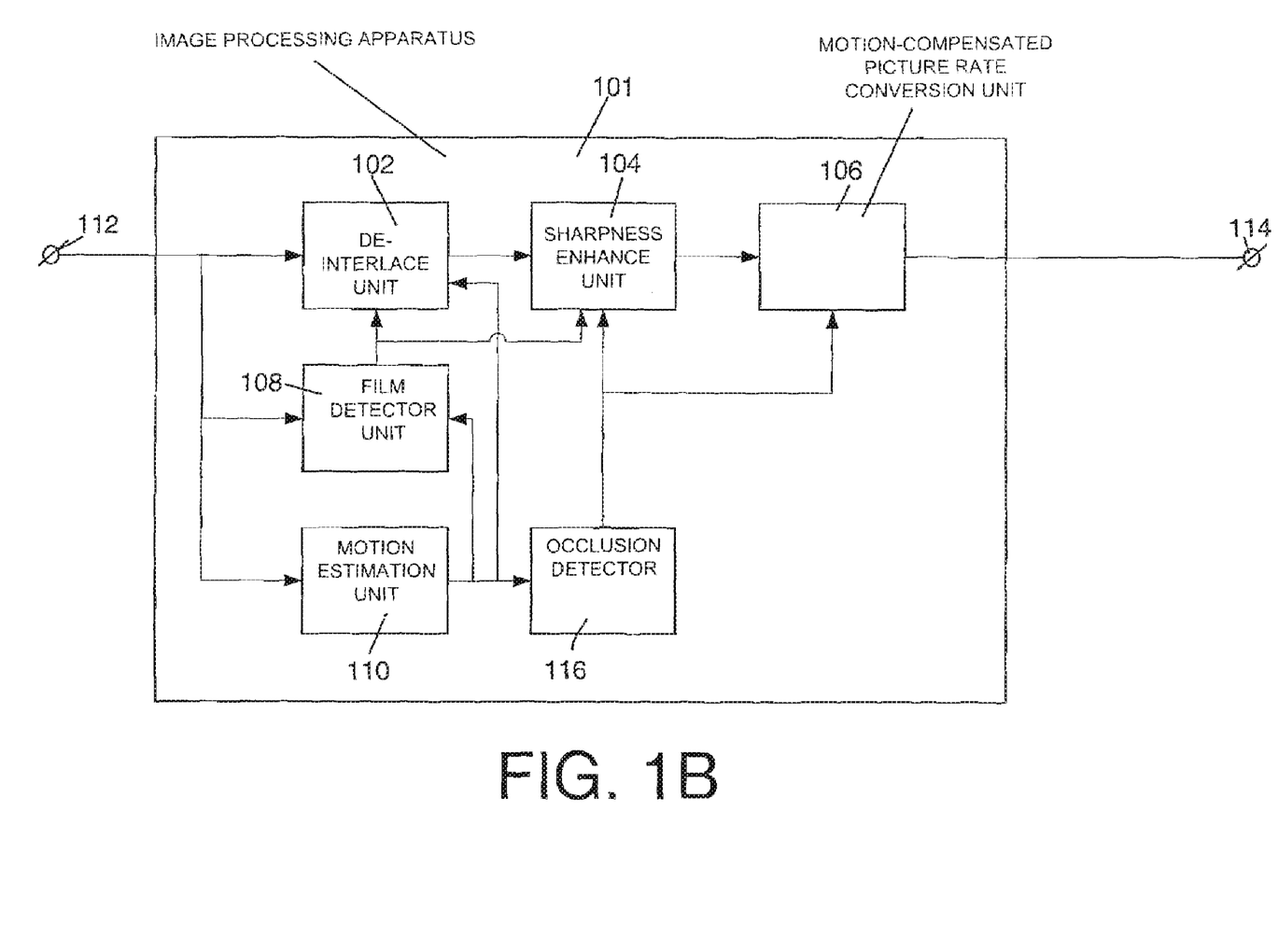
FIG. 1B schematically shows elements of the image processing apparatus according to the invention comprising an occlusion detector.

FIG. 1B schematically shows elements of the image processing apparatus 101 according to the invention comprising an occlusion detector 116 being arranged to determine the probability of correctness of motion vectors. In regions of the images where the probability of incorrect motion vectors is relatively high, the probability of artifacts is also relatively high. Sharpness enhancement in these regions could even increase the visibility of these artifacts and should be prevented. In these regions no sharpness enhancement will be performed and optionally additional blur is introduced.

An approach for calculating an occlusion map on basis of a motion vector field is described in the patent application which is entitled "Problem area location in an image signal" and published under number WO0011863. In that patent application is described that an occlusion map is determined by means of comparing neighboring motion vectors of a motion vector field. It is assumed that if neighboring motion vectors are substantially equal, i.e. if the absolute difference between neighboring motion vectors is below a predetermined threshold, then the groups of pixels to which the motion vectors correspond, are located in a no-covering area. However if one of the motion vectors is substantially larger than a neighboring motion vector, it is assumed that the groups of pixels are located in either a covering area or an uncovering area. The direction of the neighboring motion vectors determines which of the two types of area.

Figure 2:
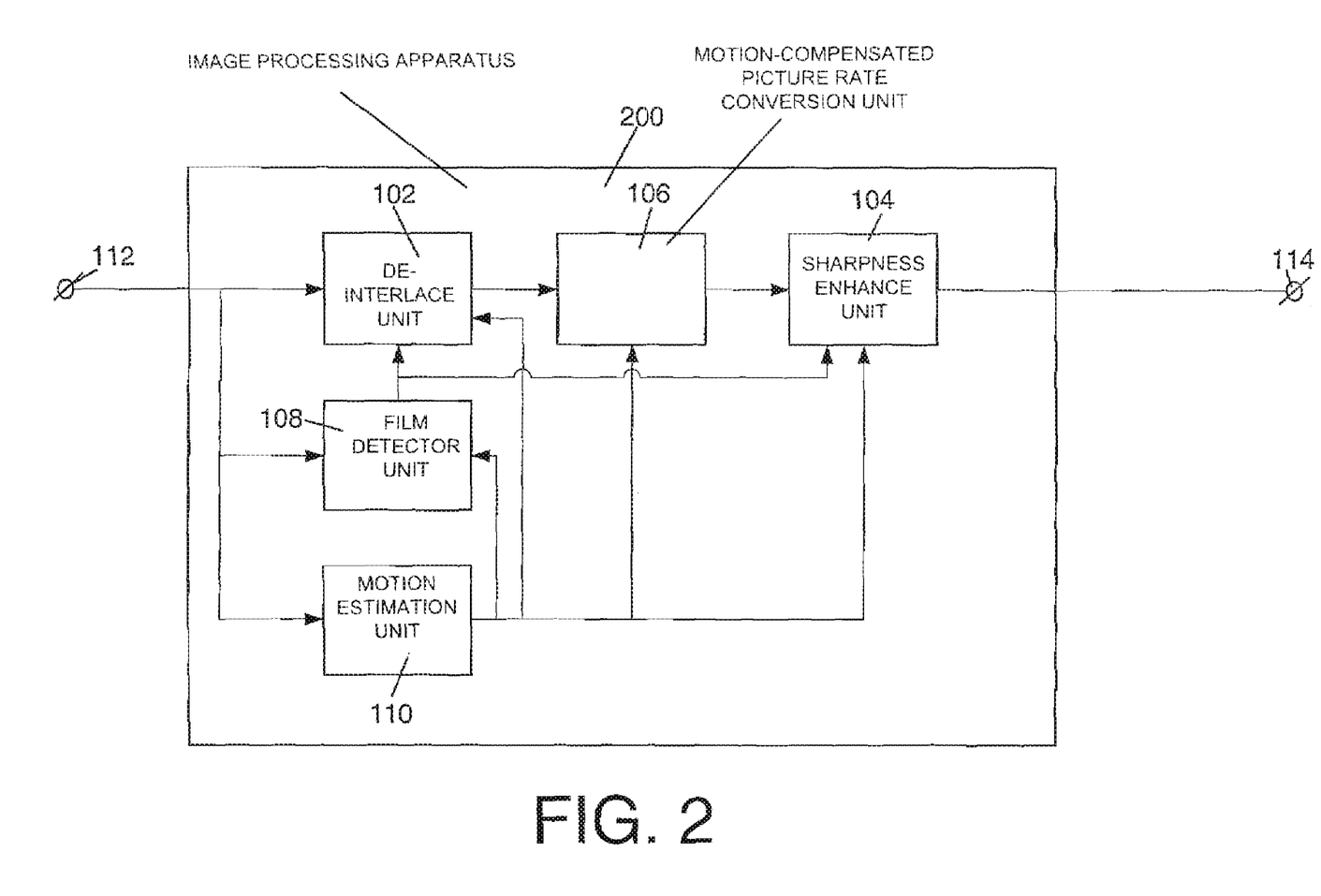
FIG. 2 schematically shows elements of the image processing apparatus according to the invention whereby the motion compensated picture-rate conversion is preceding the motion compensated sharpness enhancement.

FIG. 2 schematically shows elements of the image processing apparatus 200 according to the invention whereby the motion compensated picture-rate conversion is preceding the motion compensated sharpness enhancement. That means that the de-interlaced images are provided to the motion compensated picture-rate conversion unit 106. The output of the motion compensated picture-rate conversion unit 106 is provided to the motion compensated sharpness enhancement 104 which is arranged to treat the original and the images interpolated by the picture-rate conversion unit 106, differently. That means that the interpolated images are more enhanced than the original images. The interpolated images are less sharp because of the interpolation.

The image processing apparatus according to the invention may comprise additional components:

a display device for displaying the enhanced images, e.g. a TV-set;

storage means for storage of the enhanced images, e.g. a VCR (Video Cassette Recorder) or DVD recorder (Digital Versatile Disk); or transmission means for providing the enhanced images to a TV-set, e.g. a set-top box.

Figure 3:
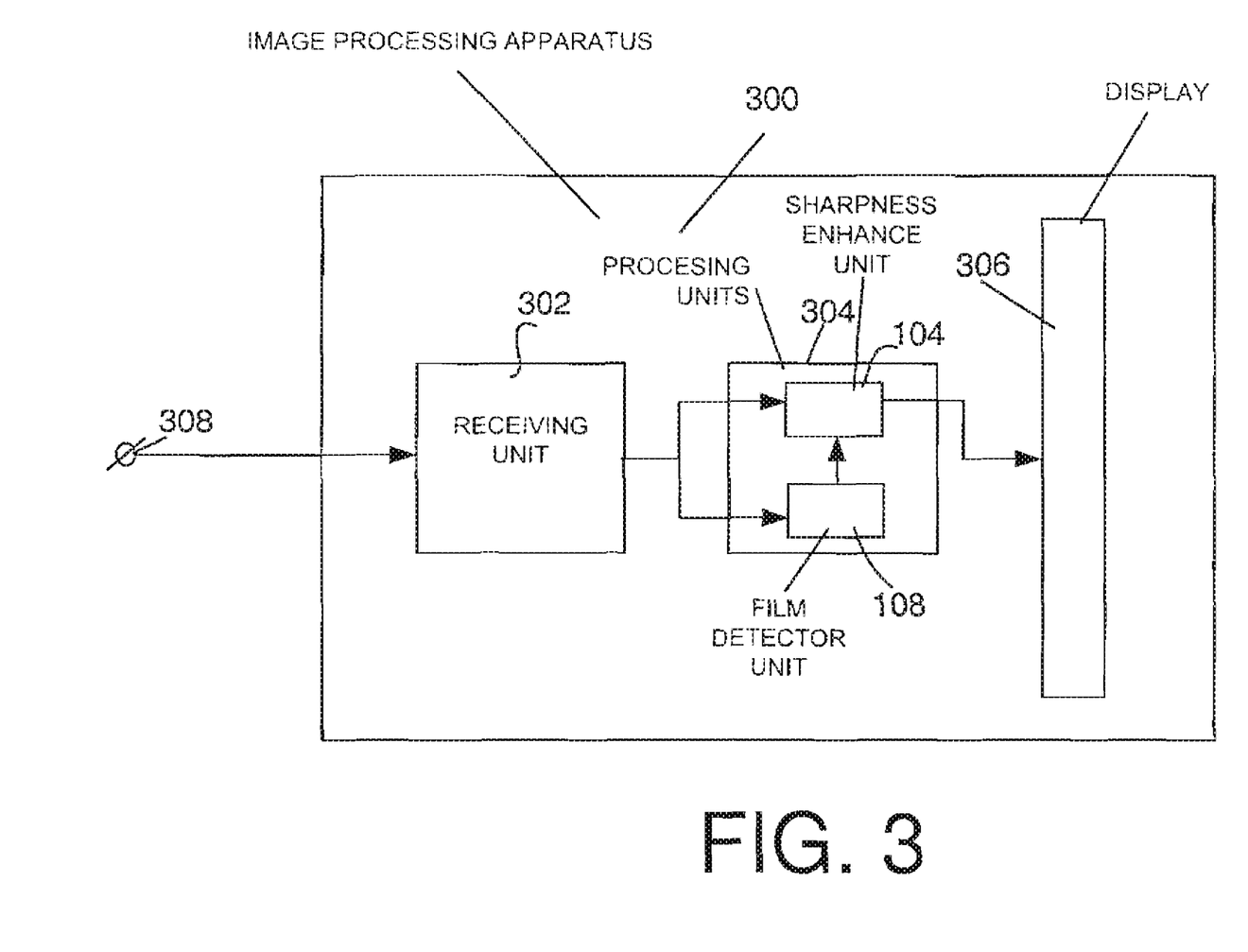
FIG. 3 schematically en embodiment of the image processing apparatus according to the invention comprising a display device.

FIG. 3 schematically shows an embodiment of the image processing apparatus 300 according to the invention, comprising:

a receiving unit 302 for receiving a signal representing images to be displayed after some processing has been performed. The signal may be a broadcast signal received via an antenna or cable but may also be a signal from a storage device like a VCR (Video Cassette Recorder) or Digital Versatile Disk (DVD). The signal is provided at the input connector 308. The receiving unit 302 is arranged to be tuned to a predetermined frequency band to extract images from the provided video signal.

a sequence of processing units 304 as described in connection with FIG. 1A, 1B or 2 for de-interlacing, motion compensated picture-rate conversion and motion compensated sharpness enhancement. Only the film-detector unit 108 and the sharpness enhancement unit 104 are depicted.

a display device 306 for displaying the enhanced images.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. An image processing apparatus comprising:

receiving means for receiving a video signal representing input images;

a film-detector unit for detecting whether the input images have been captured by a film camera or by a video camera; and a sharpness enhancement unit for calculating sharpness enhanced images from the input images, the sharpness enhancement unit being controlled by the film-detector unit, whereby the sharpness enhancement unit is arranged to be tuned for sharpness enhancement based on the detecting whether the input images have been captured by the film camera or by the video camera, wherein the sharpness enhancement unit is arranged to enhance a first part of a frequency spectrum of the input images if the film-detector unit has detected that the input images have been captured by the film camera, and to enhance a second part of the frequency spectrum of the input images if the film-detector unit has detected that the input images have been captured by the video camera, the first part and the second part being different.

2. The image processing apparatus as claimed in claim 1, characterized in that the sharpness enhancement is larger if the film-detector unit has detected that the input images have been captured by the film camera than if the film-detector unit has detected that the input images have been captured by the video camera.

3. The image processing apparatus as claimed in claim 2, characterized in that said image processing apparatus further comprises:

a motion estimation unit for estimating direction of motion of objects in the input images, the motion estimation unit controlling the sharpness enhancement unit to perform the sharpness enchancement in the direction of the motion.

4. An image processing apparatus comprising:

receiving means for receiving a video signal representing input images;

a film-detector unit for detecting whether the input images have been captured by a film camera or by a video camera; and a sharpness enhancement unit for calculating sharpness enhanced images from the input images, the sharpness enhancement unit being controlled by the film-detector unit, whereby the sharpness enhancement unit is arranged to be tuned for sharpness enhancement based on the detecting whether the input images have been captured by the film camera or by the video camera, wherein the sharpness enchancement is larger if the film-detector unit has detected that the input images have been captured by the film camera than if the film-detector unit has detected that the input images have been captured by the video camera, and wherein the image processing apparatus further comprises:

a motion estimation unit for estimating direction of motion of objects in the input images, the motion estimation unit controlling the sharpness enchancement unit to perform the sharpness enchancement in the direction of the motion, wherein the motion estimation unit estimates a speed of motion of the objects in the input images, the motion estimation unit controlling the sharpness enhancement unit to perform the sharpness enhancement based on the speed of the motion.

5. An image processing apparatus comprising:

receiving means for receiving a video signal representing input images;

a film-detector unit for detecting whether the input images have been captured by a film camera or by a video camera; and a sharpness enhancement unit for calculating sharpness enhanced images from the input images, the sharpness enhancement unit being controlled by the film-detector unit, whereby the sharpness enhancement unit is arranged to be tuned for sharpness enhancement based on the detecting whether the input images have been captured by the film camera or by the video camera, wherein the sharpness enchancement is larger if the film-detector unit has detected that the input images have been captured by the film camera than if the film-detector unit has detected that the input images have been captured by the video camera, and wherein the image processing apparatus further comprises:
a motion estimation unit for estimating direction of motion of objects in the input images, the motion estimation unit controlling the sharpness enchancement unit to perform the sharpness enchancement in the direction of the motion; and
a motion compensated picture-rate conversion unit for calculating interpolated images by temporal interpolation of the sharpness enhanced images, the motion compensated picture-rate conversion unit being controlled by the motion estimation unit.

6. The image processing apparatus as claimed in claim 5, wherein the motion compensated picture-rate conversion unit calculates interpolated images by temporal interpolation of the input images, and wherein the sharpness enhancement unit performs more sharpness enhancement for the interpolated images than for the input images.

7. The image processing apparatus as claimed in claim 5, wherein the motion estimation unit detects an edge in a motion vector field using an image pair of the input images, and the sharpness enhancement unit limits the sharpness enhancement for a region of a particular input image, the region corresponding to the edge.

8. The image processing apparatus as claimed in claim 1, characterized in that the image processing apparatus further comprises:
a display device for displaying the sharpness enhanced images.

9. A method of sharpness enhancement comprising acts of:
receiving a video signal representing input images;
detecting whether the input images have been captured by a film camera or by a video camera; and
calculating sharpness enhanced images from the input images, the calculating being based on the detecting whether the input images have been captured by the film camera or by the video camera, wherein the sharpness enhancement enhances a first part of a frequency spectrum of the input images if the input images have been captured by the film camera, and enhances a second part of the frequency spectrum of the input images if the input images have been captured by the video camera, the first part and the second part being different.

* * * * *